(12) United States Patent
Lösing et al.

(10) Patent No.: US 6,494,090 B1
(45) Date of Patent: Dec. 17, 2002

(54) AIR-MASS SENSOR

(75) Inventors: Karl-Heinrich Lösing, Alpen (DE); Christian Witty, Köln (DE); Thomas Wienecke, Korschenbroich (DE); Günter Liedtke, Essen (DE); Rainer Krinitz, Krefeld (DE)

(73) Assignee: Pierburg AG, Neuss (DE)

( * ) Notice: Subject to any disclaimer, the term of this patent is extended or adjusted under 35 U.S.C. 154(b) by 0 days.

(21) Appl. No.: 09/305,383

(22) Filed: May 5, 1999

Related U.S. Application Data

(60) Provisional application No. 60/084,452, filed on May 6, 1998.

(30) Foreign Application Priority Data

May 5, 1998 (DE) .......................... 198 19 855

(51) Int. Cl.$^7$ ................................. G01F 1/68
(52) U.S. Cl. ................................. 73/204.26
(58) Field of Search .................. 73/204.26, 204.27, 73/204; 364/431.06; 123/480

(56) References Cited

U.S. PATENT DOCUMENTS

| | | | | |
|---|---|---|---|---|
| RE31,906 E | * | 6/1985 | Oyama et al. ......... | 364/431.06 |
| 4,587,842 A | | 5/1986 | Handtmann ................. | 73/204 |
| 5,406,109 A | | 4/1995 | Whitney ..................... | 257/467 |
| 5,703,288 A | * | 12/1997 | Horiguchi et al. ....... | 73/204.26 |
| 5,707,148 A | * | 1/1998 | Visser et al. .................. | 374/31 |
| 5,753,815 A | | 5/1998 | Murata ..................... | 73/204.15 |
| 5,892,150 A | * | 4/1999 | Isono et al. ............... | 73/204.26 |
| 5,965,811 A | * | 10/1999 | Kawai et al. ............. | 73/204.26 |
| 6,098,455 A | * | 8/2000 | Nukui et al. ............. | 73/204.26 |

FOREIGN PATENT DOCUMENTS

| | | |
|---|---|---|
| JP | 06230021 | 8/1994 |
| JP | 08193862 | 7/1996 |

* cited by examiner

*Primary Examiner*—Benjamin R. Fuller
*Assistant Examiner*—Jewel V. Thompson
(74) *Attorney, Agent, or Firm*—Ladas & Parry

(57) ABSTRACT

An air-mass sensor having an air mass sensor module provided with two temperature sensors (6, 7) and two heat sensors (4, 5) which are incorporated into two separately acting bridges (I, II) whose bridge output signals ($U_{mv}$, $U_{mh}$, $U_{mq}$) are supplied to a microprocessor (16) incorporated on a common support with the air-mass sensor module. The microprocessor (16) is calibrated such that crude bridge signals ($U_{sv}$, $U_{sh}$, $U_{sq}$) measured in a base mode are inscribed in support places ($x_1$, $x_2$, $x_3$) of support place tables (St2, St3). A customer characteristic curve is filed in the form of measurement points ($m_1$, $m_2$, $m_3$) in the support place tables (St2, St3) and are utilized to adjust the crude bridge signals.

29 Claims, 4 Drawing Sheets

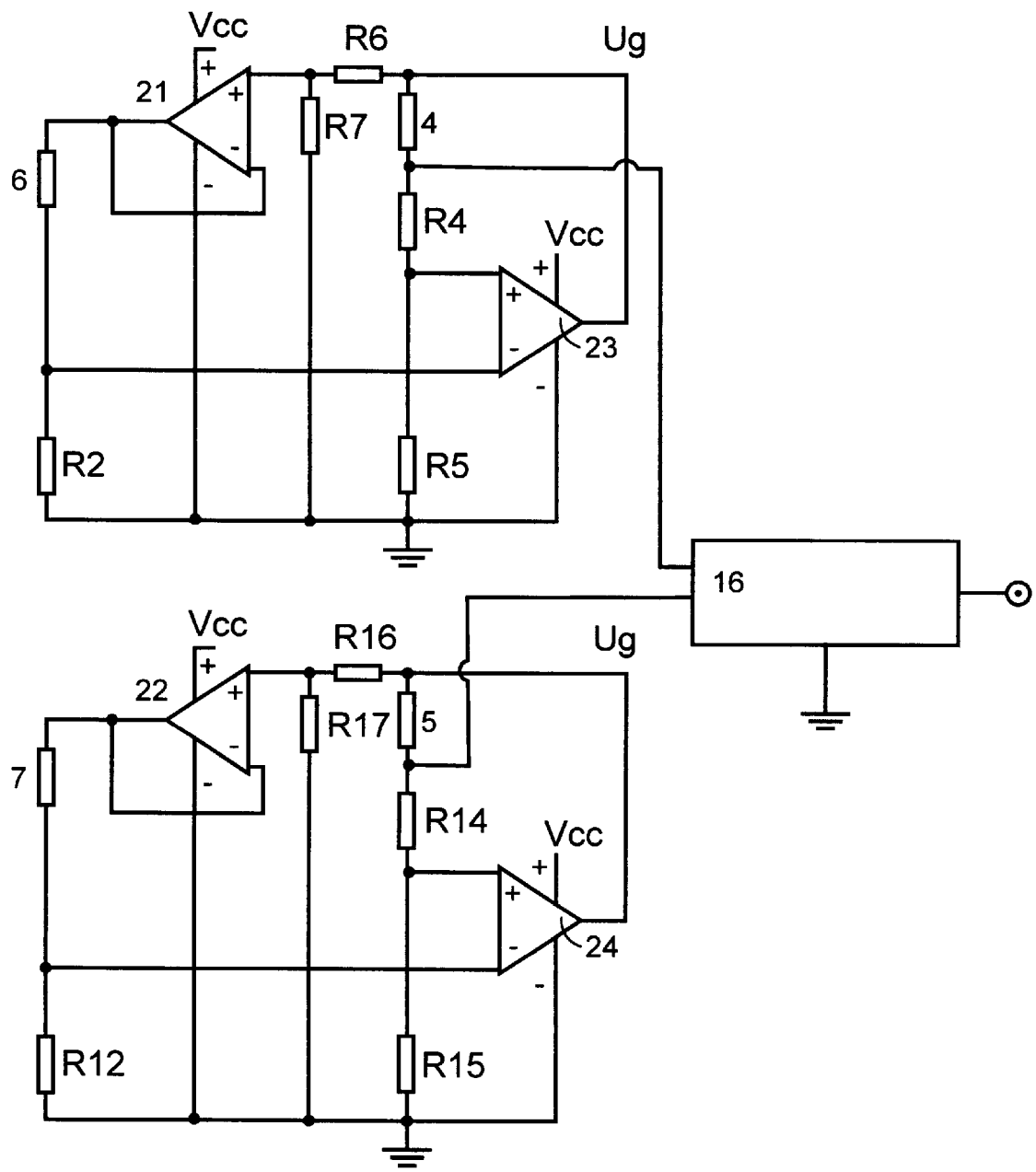
F I G. 4

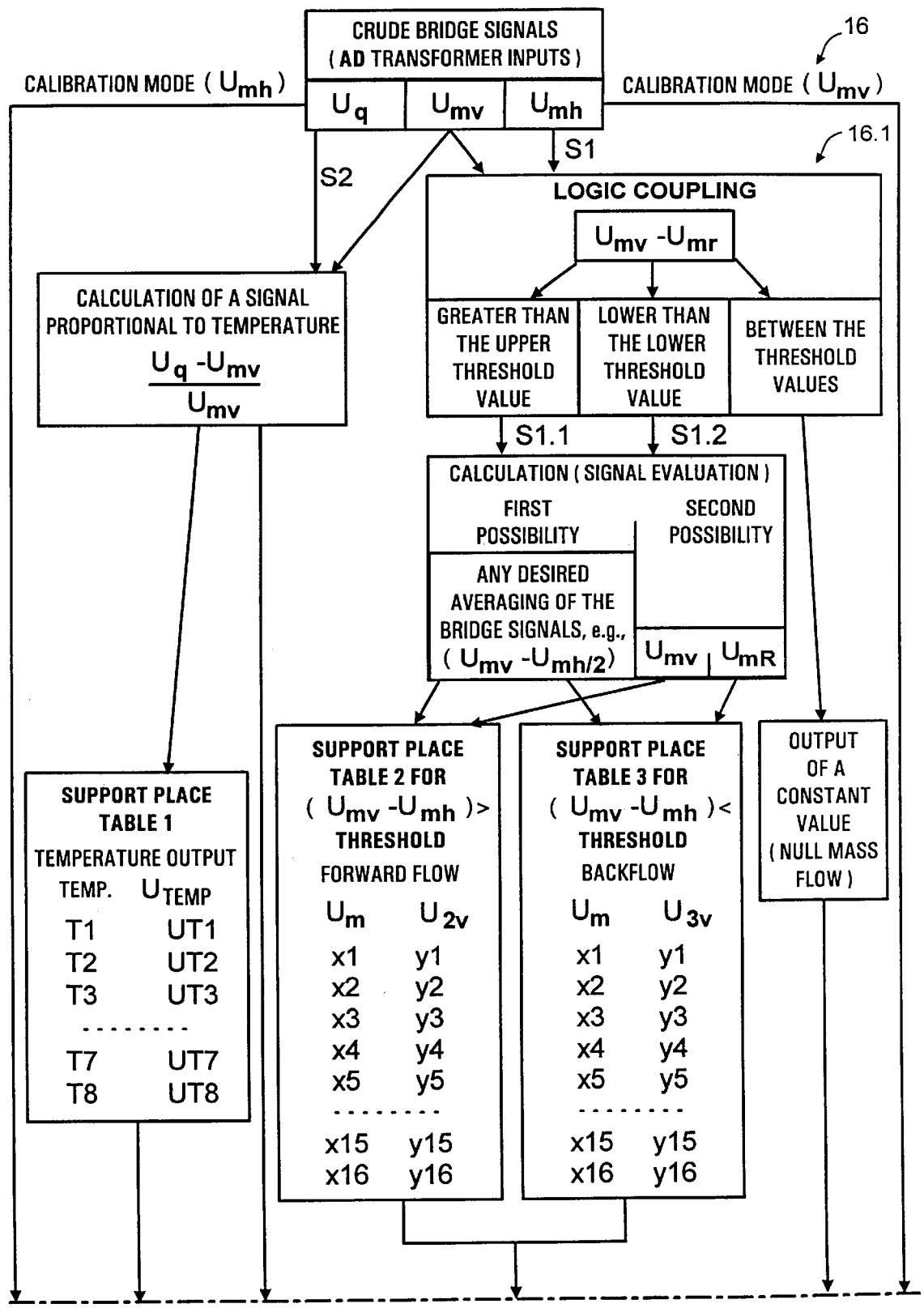
F I G. 5A

AIR-MASS SENSOR

This application claims the benefit of U.S. Provisional Application No. 60/084,452 filing date May 6, 1998 and incorporates the same by reference.

FIELD OF THE INVENTION

The invention relates to an air-mass sensor, a process for the calibration of the air-mass sensor and a signal evaluating process of the air-mass sensor.

BACKGROUND AND PRIOR ART

Air-mass sensors or air-mass meters are used particularly to determine the intake air flow of an internal combustion engine. Heating element anemometers, also designated thermal air-mass meters of known type, are used for the design of air-mass sensors. Two sensors or probes, one of which determines the temperature of the intake air and the other of which is heated to a specific over-temperature relative to the ambient temperature, are connected in different branches of a Wheatstone bridge circuit. The heated probe serving as the measuring probe is cooled by the current of air, dependent on its velocity and temperature. The additional amount of energy or a quantity dependent thereon that is required to maintain the adjusted over-temperature is then a measurement of the air-mass that has passed through the sensor.

DE 43 31 772 C2 discloses an air-mass meter, a process for determining a flowing quantity of air and a device for determining an electrical output of the air-mass meter. The air-mass meter has a temperature probe resistance and two heating elements in the form of electrical resistances, which are connected with other resistances in a bridge circuit. The temperature probe resistance and the first heating element form an air-quantity detector and are arranged on a common base plate in an air-current path. The second heating element is a component of a control circuit and is separated from the air-quantity detector in the air-current path. At a reference resistance, which is in a separate detection device, an electrical current signal determined from the bridge circuit is converted into a voltage, digitized, and input into a microprocessor of the detection device. The microprocessor balances differences between a voltage at the reference resistance and a standard value based on stored information, in routine air-mass detection, in order to eliminate the effect of the tolerances of the reference resistance. The control for the fuel injection is then produced by the electrical output current signal that is determined.

It is a disadvantage that the air-mass meter and the detection device secondary to this must be synchronized each time to one another. Also, with only a single air-mass meter, the direction of flow of the air mass cannot be detected.

SUMMARY OF THE INVENTION

An object of the invention is to provide an air-mass sensor and its mode of operation in such a way that expensive calibrations relative to the engine are not necessary and the direction of flow of the air mass can be detected simultaneously with only one air-mass sensor.

The invention is based on the concept of creating an air-mass sensor as a compact air-mass sensor module in a simple construction, with which, in addition to determining the quantity of a flowing air mass, its direction of flow can also be detected and which can also be manufactured as a mass-produced product. This objective is achieved by a construction of the air-mass sensor which has a measurement element or a sensor element, on which two separately acting heat sensors and two temperature sensors are disposed, which are connected at least to two separately operating bridges, which are also disposed in the air-mass sensor module. These two bridges make possible the determination of the quantity of the air mass and/or the direction of flow of the air mass.

Further, by integrating a microprocessor into the air-mass sensor module and with a selected programming thereof, the signal processing of the bridge signals that are determined takes place in this microprocessor, whereby a higher measurement accuracy, a greater flexibility, and a broader functional range of the air-mass sensor module are obtained. By means of support places in tabular form filed in the microprocessor and an individual signal processing, it is possible to synchronize the air-mass sensor module independently of the sensor tolerances to a specific series of an engine model. In this way, in the production of the air-mass sensor, a series of sensors can be obtained which have the same signal magnitudes at their interfaces, and thus are calibrated to a certain extent. The different sensor tolerances are equilibrated by measurement of correction values determined in a base mode or calibration mode, whose values are entered into the support place tables of the microprocessor. In order to obtain a self-contained air-mass sensor module, necessary trimming of the resistances for the calibration of the heat sensor deviations and necessary load resistances of the bridge circuits are integrated into the module.

The temperature sensors and heat sensors are introduced into two separate membranes, which are applied onto a substrate of the measurement element. The membranes are preferably disposed in one plane on one side of the substrate.

By introducing very thin membranes onto the substrate, the outflowing heat is kept small and the thermal inertial mass is minimized. Short activation times as well as high dynamics of the measurement element are achieved by the small heat capacity of the membranes and the heating structure. These dynamics are advantageous for application in mass-flow measurements with reverse or backflow.

A temperature transfer between the heat sensors and from these to the temperature sensors is prevented by a suitable selection of the distance between the heat sensors and the temperature sensors, whereby measurement errors are avoided.

The membranes protect the embedded sensors from chemical attack. Thin membranes also make it possible for the heat sensors as well as the temperature sensors to have the same thermal response times.

Preferably, silicon is used as the substrate and silicon dioxide as the membrane. The utilization of silicon technology makes it possible to reduce the resistance values of the heat sensors and the temperature sensors, whereby also the size can be kept small, despite the condition that in each bridge there must be one bridge branch of higher electrical resistance than in the other branch. This condition is satisfied by providing a voltage reduction by additional means in the temperature bridge branch of each bridge. In the case of a lower supply voltage obtained thereby, consequently, the resistance value of the temperature sensor can be reduced, whereby also the dimensions of the temperature sensor are reduced. This same reduction in voltage is also produced in the other bridge circuit with the heat sensor, the heat bridge branch, in order to retain an equilibrium of the bridges. This reduction is also produced in the second, separately acting bridge.

For further heat dissipation and thus for preventing a reciprocal temperature influencing of the heat sensors and the temperature sensors, the heat is also released to the environment through cross-pieces on the substrate. For this purpose, the substrate is adhesively secured to a substrate carrier that is a good heat conductor, preferably a ceramic piece. The ceramic piece itself is adhered by means of a heat-conducting adhesive, which is filled with small beads of defined size, onto a cooling unit, preferably an aluminum cooling unit, which releases heat to the environmental air by means of ribs. The beads also have the objective of assuring a uniform thickness of the layer of heat-conducting adhesive from one module to another to provide a specific high tolerance as well as a uniform heat dissipation.

Since a cooling unit is already included on the substrate with the measurement element, the temperature of the substrate is held at the temperature of the intake air by the cooling unit, whereby the already-mentioned thermal effect between heat sensors and temperature sensors is additionally minimized.

This measurement element with substrate carrier is mounted in the flow opening of a housing of the air-mass sensor module such that an attachment or clamping on all sides is produced in the housing, whereby the flowing medium is guided past or over the measurement element on one side thereof. By embedding the measurement element in the housing, this measurement element is protected from breakage and thus from disruption and it also has a robust, but simple structure. The measurement element of this measuring device is also protected against damage from air flow, since the measurement element is disposed flush with the flow opening of the housing, and a substrate carrier is surrounded by a frame.

The microprocessor is a component of the electronic part of the air-mass sensor module and is accommodated on a hybrid unit. The microprocessor is connected with the measurement element by means of conducting connections, for example, strip conductors. Signals are measured and entered into the support place tables in the calibration mode of the microprocessor, whereby measurement points, which correspond to the characteristics required by the customer, are filed in the support place tables. The signals are thus initiated as crude bridge signals. A comparison between the bridge output signals and the theoretical signals is then produced for the measurement points of the required characteristic curve, whereby an entry can be made into the support place tables for each established measurement point.

After the complete determination of the measurement values or the correction values and the filling in of the support place tables, another programming of the microprocessor is conducted with the signal-processing software for the air-mass sensor module. The microprocessor is brought into the programming mode for this purpose. The signal-processing software to be programmed can be partially supplied in advance by the customer, but it can also be determined, for example, by tests.

The determination of an output signal interpreting the air-mass quantity by means of measurement values filed in the support place tables, also designated as absolute values or the correction values, is made in a signal evaluating path within the signal evaluation. In addition, a determined temperature signal is output by means of another signal evaluating path. This temperature signal can be utilized as information relative to the external temperature of the intake air and thus, for example, used for regulating the heat of a passenger compartment. There is also produced a better determination of the fuel injection, since the output signal of the first signal evaluating path, which interprets the air-mass quantity, is additionally post-compensated for temperature compensation by means of adapted bridge resistances of the front bridge in the software via output-signal support places and temperature support places of the support place tables.

The software for processing the signals can be defined prior to running the series.

BRIEF DESCRIPTION OF THE DRAWING

FIG. 4 is a circuit diagram of the elements of the air-mass sensor module.

DETAILED DESCRIPTION

Figure 1:
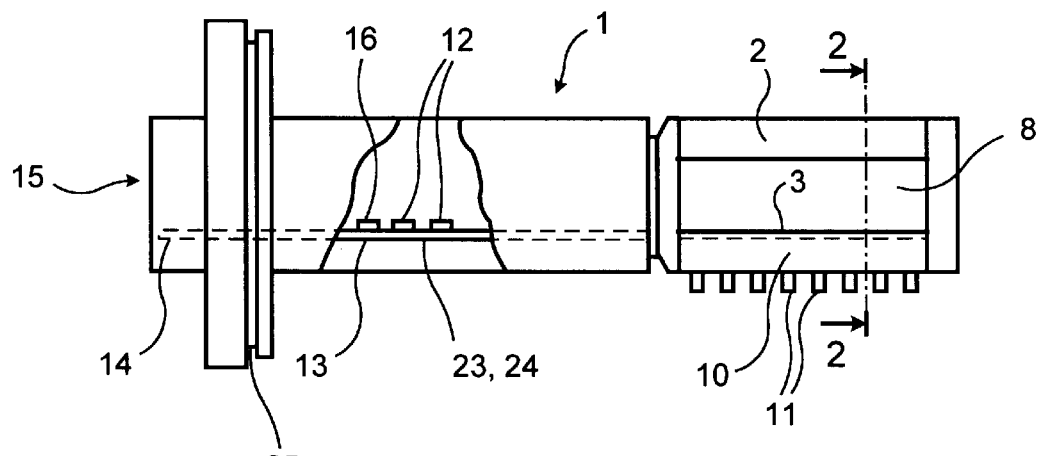
FIG. 1 is a diagrammatic illustration of an air-mass sensor module according to the invention.

An air-mass sensor module is shown in FIG. 1 and comprises a housing 2 for a measurement or sensor element 3 having heat sensors 4, 5 and temperature sensors 6, 7 (see also FIG. 3) on a measurement unit 1 in addition to other parts not shown in this figure. A rectangular flow opening 8 is provided in housing 2 for air flow 9 therethrough. Measurement element 3 is disposed in a planar manner in housing 2 below or above the flow 9 approximately centrally in flow opening 8. A cooling unit 10, for example, made of aluminum, is integrated with measurement element 3 in housing 2. Electronic components 12 are accommodated on a hybrid unit 13 in measurement unit 1 and these components are electrically connected by means of a plug connection 14 in connection part 15 with another electronic unit for different displays (not shown) or with a current supply unit (not shown) for the air-mass sensor module. The electronic components 12 may be a complete evaluating and control electronic system and contain, for example, operational amplifiers 23, 24. In addition, a microprocessor 16 is accommodated on hybrid unit 13, which like electronic components 12, is electrically connected with measurement element 3 by means of strip conductors and terminals (not shown in more detail).

Figure 2:
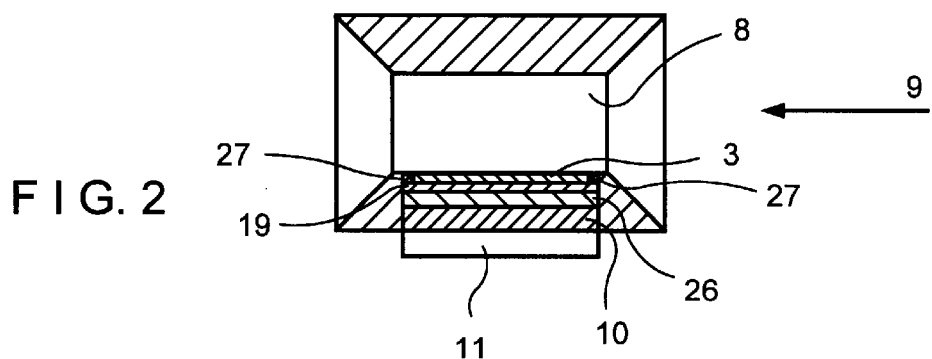
FIG. 2 is a sectional view taken on line II—II in FIG. 1.

As can be seen in FIG. 2, the flow opening 8 extends to a flow channel, which has a constriction in its cross section in the flow direction from the inlet and which then extends in the region of the measurement element 3 with sides parallel to one another, and thereafter it widens at the outlet. The section at the outlet and the inlet can be the same to enable reversal of the unit. This arrangement of the flow opening 8 is advantageous in minimizing the contamination of sensors 4, 5, 6 and 7, in making the measuring device insensitive to angular variations, but particularly in determining backflow by means of the two heat sensors 4, 5.

Figure 3:
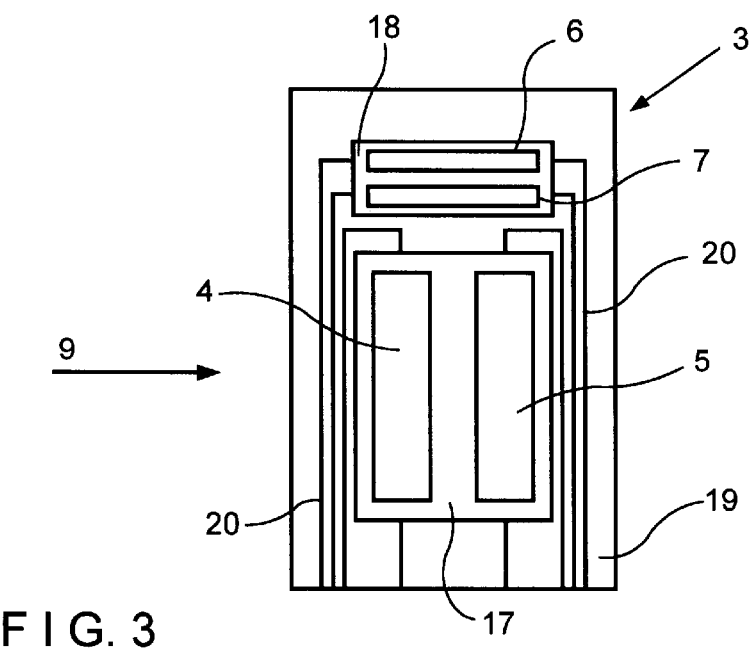
FIG. 3 is a top plan view of a measurement element in the air-mass sensor module.

Measurement element 3 is shown in simplified manner in a top plan view in FIG. 3. Measurement element 3 includes two separate membranes 17 and 18 and two heat sensors 4, 5 and two temperature sensors 6, 7 respectively embedded in these membranes. Sensors 4, 5 or 6, 7 are themselves protected against impurities by being embedded in membranes 17 or 18. Membranes 17, 18 are made of silicon dioxide layers, which are mounted on a substrate 19 of measurement element 3 and in which, each has a conducting layer, for example, of nickel, introduced therein to form sensors 4, 5, 6 and 7. Measurement element 3 is produced by semiconductor technology, whereby substrate 19 is comprised of silicon. In this way, small structures can be introduced onto substrate 19. Substrate 19 is attached to another sensor carrier 26 having good heat-conducting properties. Carrier 26 is preferably made from ceramics and is adhesively attached to the cooling unit 10 by an adhesive material in the form of a heat-conducting adhesive. The heat-conducting adhesive contains small beads (not shown) with defined thickness, whereby a uniform thickness of a heat-conducting adhesive layer is maintained in order to assure a specific high tolerance and, in addition, a uniform discharge of heat is produced. Ribs 11 are provided on cooling unit 10 to provide an increased heat output to the environment. Thus, measurement element 3 is integrated in planar manner in housing 2, by a frame 27 introduced around sensor carrier 26, i.e., around measurement element 3.

The two conducting layers for the heat sensors 4, 5 and the two conducting layers for the temperature sensors 6, 7 are introduced into membranes 17 or 18, so that two temperature sensors 6, 7, for example, of 2000Ω each and two heat sensors 4, 5, for example, of 50Ω each, are accommodated on substrate 19. In addition, trimming resistances (not shown) can be introduced selectively on substrate 19 for equilibrating heat-sensor fluctuations. Also on substrate 19 are load or bridge resistances R2, R4, R5 and R12, R14, R15, as can be seen from FIG. 4, and which are required, as is known, for the bridge circuit, as well as the electrical connecting lines or strip conductors 20.

By utilizing two heat sensors 4, 5 and two temperature sensors 6, 7 in two bridge circuits I and II, the flow direction 9 of the flowing medium can be determined. This is achieved because the two bridge circuits I and II are incorporated in the measuring system of the air-mass sensor module. Thus, heat sensor 4 as well as temperature sensor 6 with the load resistances R2, R5 associated therewith are connected conventionally in bridge I, while heat sensor 5 as well as temperature sensor 7 with load resistances R14, R15 associated therewith are connected in bridge II (FIG. 4). The taps for regulating electronic components 12 are, in conventional manner, at respective null points of the bridge branches. The heat sensor 4 or 5 first subjected to the flowing medium thus produces a different bridge imbalance and a different bridge output signal than heat sensor 5, 4 subjected secondly to the medium. If, for example, a smaller bridge output signal is measured in bridge circuit I of first heat sensor 4 than in bridge circuit II of the second heat sensor 5, then the second heat sensor 5 is the first to be subjected to the flowing medium, whereby the flow direction 9 can be determined. If the second heat sensor 5 is found at the right edge of substrate 19 or membrane 3, then the flow comes from the right. Since heat sensor 5 is connected with the second rear bridge II, a backflow would be detected opposite the normal (forward) flow 9.

Heat sensors 4, 5 and temperature sensors 6, 7 are resistances with preferably positive temperature coefficients and temperature dependencies that correspond as closely as possible to one another.

In addition to this known arrangement, bridge I and II have means according to the invention, which reduce the input voltage at the respective temperature sensor 6 or 7. This means comprises a voltage divider connected in the bridge diagonals and include resistances R6, R7, or R16, R17 as well as a respective voltage follower 21 or 22. Voltage follower 21 is thus connected between resistance R6 and temperature sensor 6. In the second bridge branch of bridge I, the heat branch, a resistance R4 is connected as an additional means between heat sensor 4 and passive resistance R5. The central taps between temperature sensor 6 and resistance R2, on the one hand, and between resistances R4, R5, on the other hand, form the bridge null branch and are connected to a negative input or to a positive input of an operational amplifier 23. The bridge electronics are supplied by a supply voltage source $V_{cc}$ and are connected on one side to electrical ground. Resistances R2, R7 and R5 have a common ground reference potential. A corresponding circuit is also provided for the second bridge II, whereby resistances R16 and R17 produce the voltage reduction in the first bridge branch with temperature sensor 7, a resistance R14 is incorporated in the second bridge branch with heat sensor 5, and an operational amplifier 24 is used.

The supply voltage $U_q$ of the first bridge branch of bridge I, i.e., of the temperature branch with temperature sensor 6 measuring temperature T, is delivered by the operational amplifier 23 and reduced by the voltage dividers R6 and R7, whereby the resistance ratio of both resistances R6, R7 determines a factor k by which the supply voltage $U_q$ is reduced. This factor k results from $k=R7/(R6+R7)$ and is always less than 1. The supply voltage $U_q$ for the first bridge branch is reduced by this factor k. Voltage follower 21 also known as an impedance transformer, is an opposite-connected direct-current amplifier, whose output voltage corresponds to its input voltage. Voltage follower 21 serves for decoupling temperature sensor 6 from voltage dividers R6, R7, in order to avoid a falsification of the voltage divider ratio. In order to maintain the bridge equilibrium, the resistance ratio of resistances R4 to R5 is also adjusted such that the output voltage of the other bride branch is multiplied by the same factor k and thus no difference occurs between the bridge taps in the normal state. These conditions for the first bridge I are also applicable to the second bridge II.

A temperature post-regulation is produced in respective bridges I and II in the conventional manner, if a disruption increases or decreases the temperature of heat sensor 4 or 5, thus changing its resistance value. This temperature regulation is produced by the respective operational amplifier 23 or 24. The post-regulation can be conducted differently and can be configured individually. Thus, a regulating transistor (not shown) can be incorporated between the output of operational amplifier 23 or 24 and the associated bridge circuit, such that the regulating transistor is either further opened or closed. However, it is also possible to connect the output of the operational amplifier 23 or 24 directly with the bridge circuit point in front of resistances R6, R7 or R16, R17. In this way, the control is always produced such that the temperature difference between temperature sensor 6 or 7 and heat sensor 5 or 5 is kept constant. With this temperature regulation, the over-temperature of heat sensor 4 or 5 is kept constant opposite temperature sensor 6 or 7 in the air-mass sensor module, so that the magnitude of the air flow that flows past is determined from the heat flow or from another quantity associated therewith.

In the conventional manner, temperature sensor 6 or 7 assumes a resistance value, which characterizes the temperature of the flowing medium. Depending on the mass of air flowing past heat sensor 4 or 5, the heat sensor is cooled more or less intensely, which leads to a detuning of the bridge i.e. to an imbalance in bridges I and II. The current necessary for fully stabilizing the bridges or the value derived therefrom is then a measure of the air mass that flows past the heat sensor 4 or 5.

In order to obtain a signal that interprets this air mass, several bridge output signals $U_{mv}$ of the first, front bridge I of the air-mass sensor module are measured, along with several bridge output signals $U_{mh}$ of the second, back bridge II of the air-mass sensor module and these signals are evaluated (as will be discussed later). The bridge output signals $U_{mv}$ are obtained via resistances R4 and R5 of the heat bridge branch of the first, front bridge I and bridge output signals $U_{mh}$ are obtained via resistances R14 and R15 of the heat bridge branch of the second, back bridge II.

For the detection of backflow, the known insulating interface effect is utilized. In order to also be able to detect small backflows, the two heat sensors 4, 5 are arranged as close as possible to one another. It must also be taken into consideration that no thermal crossover occurs from the front, first heat sensor 4 to the back, second heat sensor 5 due to heat conduction. Also, care must be taken that temperature sensors 6, 7 are not influenced by heat sensors 4, 5.

In an advantageous embodiment, measurement element 3 has outer dimensions of approximately 7.2 mm×3.2 mm. The heat sensors 4, 5 are disposed longitudinally approximately central on measurement element 3 parallel to one another. Heat sensors 4, 5 thus extend crosswise to flow direction 9 and have a specific spacing from one another in the flow direction 9, preferably a distance of approximately 0.2 mm on or in membrane 17. The width of the individual heat sensors 4, 5 is approximately 300 μm. The length of the temperature sensors 6, 7 also preferably extending parallel to one another is based on the outer dimensions of the nickel layers applied to membrane 17 for forming heat sensors 4, 5. The total thickness of membranes 17, 18 is 0.5 μm to 4 μm.

It is of decisive importance for the contours and the position of heat sensors 4, 5 and temperature sensors 6, 7 as well as measurement element 3 that the arrangement on measurement element 3 can also detect the velocity of backflows of the air mass.

Due to the technical manufacturing tolerances of the sensors 4 to 7 that are used, which arise in the production of an air-mass sensor, each air-mass sensor usually has different electrical measuring tolerances. Thus, different magnitudes of signals are produced by sensors 4 to 7 for equal air masses flowing past measurement element 3, so that the bridge output signals in bridges I or II are different from one air-mass sensor to another. Previously, each air-mass sensor had to be adapted to a characteristic curve required by the customer or by the engine manufacturer, by means of an additional, external electronic unit in the control device (not shown) of the fuel injection system.

Due to the integration of microprocessor 16 according to the invention and a digital, correcting signal processing associated with this in the air-mass sensor module, the latter is independent of tolerances, whereby in the air-mass sensor module, the correction is already produced relative to the characteristic curve required by the customer. The characteristic curves are dependent on the type of engine, the number of cylinders and the engine manufacturer. After complete assembly of the air-mass sensor module, correction values or measurement values determined in microprocessor 16 take these factors into consideration and are recorded as absolute values, and an engine-specific signal processing software is programmed accordingly.

In order to determine the measurement values or the correction values, each air-mass sensor module is placed into a base or calibration mode, in which microprocessor 16 has a so-called crude status. For this purpose, the air-mass sensor module is preferably clamped in a reconfigured air-flow channel, for example, a test work station (not shown). In the case of a predetermined air mass, i.e., for a predetermined air flow, respective bridge output signals are produced as crude bridge signals $U_{sv}$ of first, front bridge I and $U_{sh}$ are of second, back bridge II as well as a corresponding crude bridge source signal $U_{sq}$ are measured. These signals are measured in the respective bridge calibration state, i.e., if there is no bridge imbalance in bridges I or II. Thus, the crude bridge signal $U_{sv}$ corresponds to the voltage drop over resistances R4 and R5 of the heat bridge branch of the first, front bridge I of the air-mass sensor module and the crude bride signal $U_{sh}$ corresponds to the voltage drop over resistances R14 and R15 of the heat bridge branch of the second, back bridge II. The crude bridge source signal $U_{sq}$ corresponds to the respective bridge supply voltage of bridges I and II, whereby the crude bridge source signal $U_{sq}$ from the first bridge I is utilized for determining the measurement values or the correction values. The measurements are conducted by a specific number of defined air masses preferably in the direction of forward flow, since both crude bridge signal $U_{sv}$ and $U_{sh}$ are approximately equal, since heat sensors 4, 5 and temperature sensors 6, 7 are arranged in the direct vicinity relative to one another and bridges I and II themselves are also constructed in an identical manner, whereby the crude bridge signal $U_{sv}$ and the crude bridge signal $U_{sh}$ in both bridges I and II have approximately identical voltage values.

The crude bridge signals $U_{sv}$, $U_{sh}$ contain the tolerance-conditioned measuring errors caused by temperature sensors 6, 7 and heat sensors 4, 5. The crude bridge signals $U_{sv}$, $U_{sh}$ are therefore calibrated for air-mass characteristic curve required by the customer. This air-mass characteristic curve reproduces a desired dependence of an output voltage $U_{theoretical}$ on an air mass flowing each time and is recorded with y-values on a Y-axis, which are equal for all sensor modules in a series. Preferably, 16 measurement points $m_1$, $m_2$, $m_3$, etc. of the predetermined air-mass characteristic curve are recorded in a support place table St2 "forward flow" as y-voltage theoretical values $U_{theoretical}$ of the forward flow and in a support place table St3 "backflow" with respect to the same throughputs at the same measurement points $m_1$, $m_2$, $m_3$ as y-voltage theoretical values $U_{theoretical}$ of the backflow, i.e. the theoretical output voltages $U_{theoretical1}$ to $U_{theoretical3}$, etc. of the defined air masses are filed on the $y_1$ to $y_3$ support places, etc. of the support place tables St2 and St3. The actual crude bridge signals $U_{sv}$ measured for the respective throughput of the air masses are recorded on an X-axis as $x_1$ to $x_3$ support places, etc. and compared with the theoretical values $U_{theoretical1}$ to $U_{theoretical3}$ on the Y-axis. For example, if the actual crude bridge signals $U_{sv}$ determined from the air-mass sensor module are equal to 0.8 V at measurement point $m_1$, equal to 1.1 V at measurement point $m_2$, and equal to 1.3 V at measurement point $m_3$ etc., these crude bridge signals $U_{sv1}$ to $U_{sv3}$, etc. are recorded in the $x_1$, to $x_3$ support places, etc. of the "forward flow", which also correspond to the $x_1$, to $x_3$ support places, etc. of the "backflow". These different crude bridge signals $U_{sv1}$ to $U_{sv3}$ etc. thus correspond to an adjusted throughput of the air masses from, for example, $m_1$ equal to 5 kg/h, $m_2$ equal to 10 kg/h, and $m_3$ equal to 20 kg/h, etc. Air-mass equivalent output signals $U_{theoretical1}$ to $U_{theoretical3}$, etc. that deviate, however, from the crude bridge signals $U_{sv1}$, to $U_{sv3}$ etc., at measurement points $m_1$, $m_2$, $m_3$, are filed at the $y_1$ to $y_3$ support places, etc. of support place tables St2 and St3 due to the air-mass characteristic curve established by the customer. Thus, for example, a respective theoretical output voltage $U_{theoretical1}$ of 1.1 V, a $U_{theoretical2}$ of 1.2 V and a $U_{theoretical3}$ of 1.3 V are stored in the $y_1$ to $y_3$ support places, etc. of the "forward flow", and a $U_{theoretical1}$ of 1.0 V, a $U_{theoretical2}$ of 1.19 V and $U_{theoretical3}$ of 1.28 V are stored in the $y_1$ to $y_3$ support places, etc. of the "backflow". For all measurement points $m_1$, $m_2$, $m_3$, after recognizing the air-mass throughputs belonging to them, i.e., the respective measurement point, these are arranged by the output voltage theoretical values $U_{theoretical1}$ to $U_{theoretical3}$, etc. from the $y_1$ to $y_3$ support places, so that for the actual crude bridge signals $U_{sv1}$ to $U_{sv3}$, etc. at each measurement point $m_1$, $m_2$, $m_3$, an output voltage signal $U_{yq}$ to $U_{y3}$ etc. is present, which is to be calculated for the application of the air-mass sensor module, which corresponds to the output voltage theoretical value $U_{theoretical}$ at these measurement points $m_1$, $m_2$, $m_3$. Thus, the actual crude bridge signal $U_{sv}$ from the actual air-mass throughput is replaced by the output voltage $U_{theoretical}$, required by the customer. Thus, for example, a measured crude bridge signal $U_{sv}$ of 0.8 V corresponds to a $U_y$ of 1.1 V for forward flow and to $U_y$ of 1.0 V for backflow.

If an output voltage of less than 1 V is required by the customer for the backflow, for example, a $U_{theoretical1}$ of 0.8 V, a $U_{theoretical2}$ of 0.85 V and $U_{theoretical3}$ 0.83 V are stored in the $y_1$ to $y_3$ support places, etc. of the "backflow". With these values, the actual crude bridge signals $U_{sv1}$ to $U_{sv3}$, etc. from the actual air-mass throughput are assigned to the output voltage $U_{theoretical1}$ to $U_{theoretical3}$ required by the customer. Thus, a measured crude bridge signal of $U_{sv}$ of 1.1 V corresponds to a $U_y$ of 0.85 V in the backflow.

An adaptation of the values measured that lie outside the 16 measurement points is obtained by an interpolation between the support places within the respective support place tables St2 and St3 with the use of the air-mass sensor module for the complete customer characteristic curve for "forward flow" and for "backflow".

Another possibility for filling in support place tables St2 and St3 consists of determining the correction values, i.e., the different values for a measurement point.

Thus, for example, the actual output voltage values $U_{sv}$ of 1.0 V, 1.1 V and 1.3 V can lie at respective measurement points $m_1$, $m_2$, $m_3$. Since the customer's characteristic curve at these measurement points $m_1$, $m_2$, $m_3$, however, provides the respective output voltage theoretical values 1.1 V, 1.2 V and 1.3 V, the difference between the two output voltage values $U_{sv}$ and $U_{theoretical}$ is determined and recorded in support places St2. The correction value at measurement point $m_1$ thus amounts to a $\Delta U_1$ of 0.1 V at measurement point $m_2$ $\Delta U_2$ of 0.1 V and at measurement point $m_3$ $\Delta U_2$ of 0.1 V. This subtraction correction takes place in an equivalent manner in the measurement points of the support place table St3 "backflow". The measured bridge voltage $U_{sv}$, as in the above example, amounts to 1.0 V at measurement point $m_1$, 1.1 V at the second measurement point $m_2$, and 1.3 V at the third measurement point $m_3$. Due to the air-mass characteristic curve established by the customer, air-mass equivalent output signals that are different are found at these measurement points $m_1$, $m_2$, $m_3$, and these have the respective output voltage values of $U_{theoretical1}$ of 0.8 V, 0.7 V or 0.5 V. The correction value $\Delta U_1$ thus amounts to (−0.2) V for measurement point $m_1$, $\Delta U_2$ thus amounts to (−0.4) V for measurement point $m_2$ and $\Delta U_3$ amounts to (−0.8) V for measurement point $m_3$.

Crude bridge signals $U_{mv}$ and $U_{mh}$ measured in the operation of the air-mass sensor module are corrected by these correction values $\Delta U_1$ to $\Delta U_3$. In the case of the first variant, a replacement of the measured voltage signals $U_{mv}$ and $U_{mh}$ by the predetermined output voltage theoretical value $U_y$ of the air-mass characteristic curve is produced. The corrected output voltage signals $U_{ak}$ resulting from the two variants are further processed in the air-mass sensor module (discussed below).

Another calibration of the air-mass sensor module is obtained in another support place table St1 "temperature output" and in a support place table St4 "temperature compensation", which contain empirically determined data.

In the support place table St1, the temperature characteristic curve given in advance by the customer, for example, is described by 8 measurement points, and filed in the y-support places of the support place table St1. In a later programming mode, the temperature values $U_{temp}$ are calculated from the crude bridge signals $U_{mv}$ and $U_q$ and are entered in the x support places of support place table St1. The calculated actual temperature values T are determined by temperature signals $U_{temp}$ and are calibrated for the required characteristic curve. For this purpose, the actual temperature signals $U_{temp}$ are assigned to the respective theoretical temperature signals $U_{theoreticaltemp}$ and are entered into support place table St1. Also, a calibration for the temperature characteristic curve is obtained by interpolation.

By the use of the temperature support place table St1, a voltage signal $U_{temp}$, which characterizes the temperature T at temperature sensor 6 with the use of the air-mass sensor module, is adapted or corrected specifically for the customer.

As is known, temperature sensors 6, 7 and heat sensors 4, 5 have different resistance characteristics as a function of the ambient temperature T. In this way, in addition to the manufacturing tolerances, there are also errors caused by the temperature within bridges I or II. In order to recognize this error and to exclude a falsification of the measurement values, correction values are read into support place table St4 for a temperature compensation, since the corrected output voltage signal $U_{ak}$ also has temperature-conditioned tolerances.

In the case of a temperature compensation, one parameter is temperature T and another parameter is the quantity of flowing air mass. Thus, for a flow-through quantity of 100 kg/h at, for example, −20° C., a different temperature correction value is obtained compared to, for example, a flow quantity of 5 kg/h at −20° C. Since 3D interpolation involves too many calculations, five characteristic curves are filed in support place table St4, whereby these characteristic curves contain correction values for the air mass. Also, four different, successive corrected output voltage values $U_y$ interpreting the air mass from support place tables St2 or St3 are preferably read into support place table St4 and are calibrated by interpolation to the respective temperature characteristic curve. The calibrated 10 output voltage signals $U_a$ are then assigned to the respective temperature characteristic curve.

The actual bridge signals $U_{sv}$ are thus filed in support place tables St2, St3 as x-values and the respective correction voltage characteristic curve as y-values.

In addition to filling up the support place tables St1–St4 that are used, a signal processing or a signal evaluating process is programmed into microprocessor 16, for which purpose the filled-up microprocessor 16 is brought into the programming mode. The filling up of support place tables St1–St4 of microprocessor 16 is performed individually for each air-mass sensor module, but the commitment entries for the signal evaluating process are made equal, however, for all air-mass sensor modules of a sensor series.

In the case of the determination of the quantity of mass flow-through, a distinction is made between a signal evaluation by averaging and a pure signal evaluation without averaging. Averaging has the advantage that the air-mass sensor module then has a greater insensitivity to dirt particles at sensors 4 to 7.

Figure 5B:
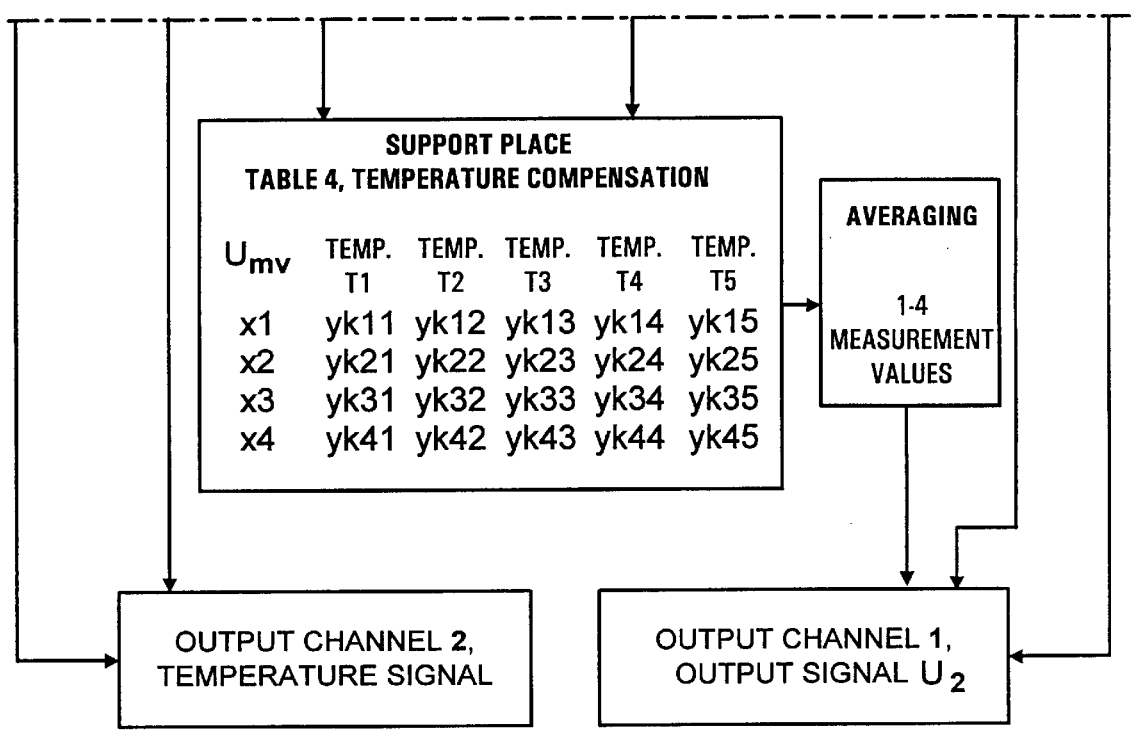
FIG. 5 shows a flow chart of signal processing in the air-mass sensor module.

Such a signal evaluating process is shown in FIG. 5.

The measured bridge signals $U_{mv}$ from the first bridge I and $U_{mh}$ from the second bridge Ii are processed and evaluated in the first signal evaluating path $S_1$ in such a way that an output voltage signal $U_a$ represents the quantity of the flowing air mass, i.e., the mass flow-through, is supplied at output A2 of the air-mass sensor module.

Another signal evaluating path S2 in the signal processing software makes possible the production and preparation of a temperature signal $U_T$ representing the temperature of the air mass, which signal can be received at output A1 of the air-mass sensor module, and characterizes the actual ambient temperatures T at temperature sensor 6. The representation of the signal evaluating process shows two signal evaluating paths S1.1 and S1.2 within the first signal evaluating path S1 for determining the quantity of mass flow-through.

Microprocessor 16 actually contains in a technical program only one of signal paths S1.1 or S1.2. However, both signal paths S1.1 and S1.2 have been considered as different possibilities for purposes of description.

In the first signal evaluating path S1, the direction of flow 9 of the measured air masses is determined according to the measurement of bridge signals $U_{mv}$ and $U_{mh}$. Thus, bridge signal $U_{mv}$ corresponds to the voltage drop at resistances R4 and R5 of the heat bridge branch of bridge I. the bridge signal $U_{mh}$ corresponds to the voltage drop at resistances R14 and R15 of the heat bridge branch of bridge II.

The determination of flow direction 9 takes place in an evaluating logic 16.1, which is a component of microprocessor 16. Upper and lower threshold values are given in evaluating logic 16.1 for the calibration of microprocessor 16, in order to provide a clear distinction of flow direction 9.

For this purpose, a difference $\Delta$ is formed between bridge signals $U_{mv}$ and $U_{mh}$. A region found between the two threshold values, preferably of $\Delta$ 10–30 mV, forms a so-called dead region, by which it is prevented that in the case of extremely small differences between the front bridge signal $U_{mv}$ and the back bridge signal $U_{mh}$, the air-mass sensor module produces an unstable, pulsating output voltage signal $U_a$. By subtraction of the second bridge signal $U_{mh}$ from the first bridge signal $U_{mv}$ as well as by a comparison with the threshold values, it is established whether the difference or the signal resulting therefrom lies above (greater than 30 mV), below (less than 10 mV) or within the threshold values.

If the difference lies within the dead region, i.e., the quantity of air-mass flow tends toward zero, a constant output voltage signal value $U_a$, for example, of 1 volt, is given at the output A2 of the air-mass sensor module.

However, if the difference lies above the upper threshold value or below the lower threshold value, a signal evaluation is obtained by averaging, i.e., within signal evaluating path S1.1 or by pure signal evaluation without averaging within said evaluating path S1.2.

In the case of averaging, a mean value is formed from the bridge signals $U_{mv}$ and $U_{mh}$, whereby an averaged bridge signal $U_{mvh}$ is produced. The signals $U_{mvh}$ calculated by averaging serve for support place measurement point searches in support place table St2 "forward flow" in support place table St3 "backflow". This depends on which flow direction 9 has been determined. With the recognition of a positive (forward) flow, i.e., if the difference between the bridge signals $U_{mv}$ and $U_{mh}$ lies above the upper threshold value, i.e., is greater than 30 mV, the averaged bride signal $U_{mvh}$ is read into support place table St2. If a negative (backflow) is recognized, i.e., if the difference between bridge signals $U_{mv}$ and $U_{mh}$ is less than the lower threshold value, i.e., less than 10 mV, the reading is made into support place table St3.

By means of support place tables St2 and St3 filled in with the output voltage signals $U_y$ in the calibration mode, there is produced in these tables a replacement of the measured and averaged, tolerance-associated bridge signals $U_{mvh}$, for the intermediate determination of an output signal $U_{my}$, whereby a characteristic-curve interpolation takes place in support place tables St2 or St3. The characteristic-curve interpolation is different in the respective support place tables St2 and St3, since a forward flow and backflow are different in the air-mass characteristic curve.

The output signals $U_{my}$ replaced in support place tables St2 or St3 are preferably subjected to an additional temperature compensation, in order to exclude inaccuracies caused by the temperature dependence of sensors 4–7. Thus, for example, four output signals $U_{my}$ from support place table St2 or from support place table St3 are read into support place table St4 "temperature compensation". The temperature compensation of the corrected output signals $U_{my}$ and thus the determination of an output voltage signal $U_{aT}$ is thus produced by comparison of the tables. By the determination of an actual temperature T of the flowing air mass (to be discussed below), the output signals $U_{my}$ are assigned to a temperature support place $Y_k$ in the support place table St4, behind which again lies a temperature-compensated output signal $U_{aT}$.

In the following floating averaging, which is optionally established by the program, the output voltage signal $U_a$ is determined equally either from a determined, temperature-corrected measurement value, or an averaged output voltage signal $U_{aT}$ is calculated from two, three or four successive, determined, temperature-corrected measurement values, in order to obtain an optimal temperature compensation of the output voltage signal $U_a$, for example, for control of fuel injection. This determination is dependent on which determination of the measurement value provides the better measurement result for the output voltage signal $U_a$.

Instead of averaging from $U_{mv}$ and $U_{mh}$, the pure measured bridge signals $U_{mv}$ or $U_{mh}$ can be utilized for seeking the support place table measurement points and depending on the sign of the difference, $U_{mv}$ and $U_{mh}$ can be read into support place table St2 or into support place table St3 and are interpolated therein. Here also, the determination of flow direction 9 is made first and then the correction of the read-in bridge signals $U_{mv}$ or $U_{mh}$ in support place tables St2 or St3. The corrected output signal $U_{my}$ is also read into support place table St4 either from support place table St2 or St3. As already described, the temperature compensation in support place table St4 is produced by comparison of the tables and then the optionally determined floating averaging as well as the output of the output voltage signal $U_a$ are found.

This output voltage signal $U_a$ represents an output signal that is proportional to the air mass.

To obtain an additional temperature signal $U_{temp}$, it is determined that a voltage $U_{temp}$ drop at temperature sensor 6 is a function of temperature T depending on supply voltage $U_q$, i.e. $U_{temp}=f(T)$. The voltage $U_{temp}$ corresponds to voltage $U_{mv}$ applied to the bridge null branch.

Thus, a temperature signal $U_{temp}$ can be calculated from the bridge signal $U_{mv}$ of the first bridge I interpreting the air-mass flow and supply voltage $U_q$. This can be obtained, for example, by means of the formulas:

$$U_{RS}=U_{mv}*U_{RS}/(R4+R5)$$

and $$U_{temp}=U_q/\Delta U_{RS}.$$

The calculated temperature signal $U_{temp}$ is also read into support place table st1 "temperature" and compared with the temperature characteristic curve given in advance or indicated by the customer, frequently that of an NTC resistance. Due to the support place table St1 and the filed preset values, it is not important whether air-mass sensor module itself has an NTC temperature sensor 6 or has a PTC temperature sensor 6. These differences are equilibrated in the readout of support place table St1, since the temperature signals $U_{temp}$ are replaced by temperature signal $U_{T1}$–$U_{T8}$. The calculated temperature signals $U_{temp}$ are assigned to equivalent temperature signals $U_{T1}$–$U_{T8}$ of the characteristic curve, so that the voltage signals $U_{T1}$, $U_{T2}$, $U_{T3}$, etc. representing the actual ambient temperatures T1, T2, T3 etc. are applied at the output A1 of the air-mass sensor module.

The calculated temperature signals $U_{temp}$ are thus used for temperature compensation in the air-mass sensor module, but may also be utilized as voltage signals $U_{T1}$, $U_{T2}$, $U_{T3}$ for other regulation and/or technical-control purposes.

Microprocessors 16 of an entire series of air-mass sensor modules are programmed with the described signal evaluating method for a special engine-model series. The air-mass sensor module thus provides a pulsation correction independent of the engine of an exact temperature compensation in the overall temperature range and a linearized output voltage signal $U_a$. Thus, the response dynamics of the air-mass sensor module are reduced to less than 1 ms and the accuracy simultaneously increases. By creating interface outputs in connector 14, a freely selectable voltage position of the output voltage signal $U_a$ as well as a pulse-width modulation are possible. In this way, the signal output can be adapted to different control devices connected downstream. In addition, a digital bus output can be created. In addition to a higher accuracy and a higher flexibility, an expanded functional range is created. Thus, if at least one of sensors 4 to 7 has failed, and/or if interruptions are found in the cable harness to the control device, this can be recognized.

The air-mass sensor module is secured in an air current path (intake channel), which is not shown in detail, in clamping part 25, whereby flow opening 8 points in flow direction 9. Thus, air-mass sensor module can completely or partially extend into the air-current flow path so that the air-flow mass flows over the sensors 4 to 7 arranged on measurement elements.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. An air-mass sensor for measuring mass flow of intake air for an internal combustion engine comprising:
   a self-contained air mass sensor module having a support provided with means for attachment in a flow path of air for the internal combustion engine,
   said self-contained air mass sensor module including a measurement element integrated with a microprocessor, said measuring element being disposed in said air flow path and including two temperature sensors and two heat sensors exposed to the air flow, said temperature sensors and said heat sensors being arranged in proximity to one another and connected in respective bridges of a bridge circuit, said bridges including respective resistances therein, and
   said microprocessor being mounted with said measuring element on said support as said self-contained air mass sensor and being electrically connected to said bridge circuit to receive output signals from said bridge circuit representing mass of the air flow and its temperature thereof, said microprocessor including digital processing means for correcting said output signals received from said bridge circuit based on variations of properties of said temperature sensors, said heat sensors, and said resistances and on properties of said engine, said digital processing means including a memory in which correction data is stored related to said properties of said sensors, said resistances and said engine whereby said self-contained air mass sensor module produces output signals which are adapted to production variations of the said sensors and resistances and to the particular engine.

2. An air-mass sensor as claimed in claim 1, wherein said measurement element further comprises a substrate, two separate first and second membranes on said substrate, said heat sensors being embedded in the first membrane and said temperature sensors being embedded in the second membrane.

3. An air-mass sensor as claimed in claim 2, wherein said substrate is made of silicon and said membranes are made of silicon dioxide, said membranes having a thickness of 0.5 $\mu$m to 4 $\mu$m.

4. An air-mass sensor as claimed in claim 2, comprising strip conductors on said substrate connecting said measurement element to said microprocessor and a substrate carrier having high heat conductivity supporting said substrate.

5. An air-mass sensor as claimed in claim 4, comprising a conductive adhesive connecting said substrate to said carrier, said adhesive containing small beads with defined thickness, to provide a uniform thickness of a heat-conductive adhesive layer between the substrate and the substrate carrier to assure a specific thickness tolerance, and a uniform discharge of heat.

6. An air-mass sensor as claimed in claim 1, wherein a first of said heat sensors is arranged upstream in said air flow and the second of said heat sensors is arranged downstream in said air flow, said first heat sensor and a first of said temperature sensors being connected in a first of said bridges and said second heat sensor and the second of said temperature sensors being connected in a second of said bridges.

7. An air-mass sensor as claimed in claim 6, further comprising a voltage divider and a voltage follower in each bridge to reduce voltage at the respective said temperature sensor in said bridge, said voltage divider comprising a first resistance in series with said voltage follower which, in turn, is in series with said respective temperature sensor, and a second resistance in parallel with said voltage follower and said respective temperature sensor, said second resistance being connected in parallel with the respective said heat sensor in said bridge which is connected in series with two of said further resistances, the voltage at the said respective temperature sensor being reduced by said voltage divider by a factor k, one of said further resistances having a resistance value to reduce the voltage in a bridge branch of said bridge by the same factor k to maintain bridge balance.

8. An air-mass sensor as claimed in claim 1, comprising a housing having an opening for flow of air past said sensors, said housing defining a flow channel for said flow of air which includes a central portion of uniform cross-section which is bounded on one side by said sensors, and an air inlet and an air outlet at opposite ends of said central portion which respectively converge and diverge in the direction of air flow.

9. An air-mass sensor as claimed in claim 1, wherein the heat sensor of a first of said bridges is arranged upstream in said air flow and the heat sensor of the second of said bridges is arranged downstream in the air flow.

10. An air-mass sensor as claimed in claim 1, wherein said microprocessor effects replacing said crude bridge signals ($U_{sv}$, $U_{sh}$) at measurement points ($m_1$, $m_2$, $m_3$) by output voltage theoretical values ($U_y$).

11. An air-mass sensor as claimed in claim 10, wherein differences between said crude bride signals ($U_{sv}$, $U_{sh}$) and said output voltage theoretical values ($U_y$) are determined at measurement points ($m_1$, $m_2$, $m_3$) and are entered as correction values ($\Delta_{u1}$, $\Delta_{u2}$, $\Delta_{u3}$) at measurement points ($m_1$, $m_2$, $m_3$) of the respective support place tables (St2, St3).

12. An air-mass sensor as claimed in claim 1, wherein an additional temperature signal ($U_{temp}$) is determined within another signal evaluation path (S2), to which temperature output signals ($U_{t1}$, $U_{t2}$, $U_{t3}$) are assigned by a temperature characteristic curve filed in a support place table (St1), which signals are applied at another output (A1) of the air-mass sensor module.

13. An air-mass sensor as claimed in claim 12, wherein the temperature signal ($U_{temp}$) is calculated from a ratio of the supply voltage signal ($U_q$) to the bridge signal ($U_{mv}$) of the first, front bridge.

14. An air-mass sensor as claimed in claim 13, wherein either an averaging (S1.1) of bride signals ($U_{mv}$, $U_{mh}$) is produced within the first signal evaluating path (S1) or a pure signal evaluation (S1.2) is conducted without averaging the bridge signals ($U_{mv}$, $U_{mh}$).

15. An air-mass sensor as claimed in claim 14, wherein a constant output voltage signal ($U_a$) is output with a difference ($\Delta$) within the predetermined threshold values.

16. An air-mass sensor as claimed in claim 15, wherein a characteristic-curve interpolation is conducted between support places ($x_1$, $x_2$, $x_3$) within support places (St2, St3).

17. An air mass sensor as claimed in claim 1, wherein the integrated measuring element and microprocessor of said air mass sensor are arranged on said support such that with said measuring element in said air flow path, said microprocessor is out of said air flow path and is adapted for attachment to a circuit board for delivery of said output signals.

18. A process for calibration of an air-mass sensor having a module with two temperature sensors and two heat sensors exposed to an air flow, the temperature sensors and heat sensors being connected in respective bridges of a bridge circuit, and a microprocessor connected to the bridge circuit to receive output signals from the bridge circuit indicating mass of the air flow and its temperature and wherein the heat sensor of a first of said bridges is arranged upstream in said air flow and the heat sensor of a second of said bridges is arranged downstream in the air flow, said process comprising:

producing respective measurement points ($m_1$, $m_2$, $m_3$) for different defined air mass flows past the sensors, providing crude bridge signals ($U_{sv}$, $U_{sh}$) for individual measurement points from the first and second bridges, said crude bridge signals ($U_{sv}$, $U_{sh}$) being a measurement of or readjustment to obtain a renewed bridge balance for the respective air mass, storing in the microprocessor the crude bridge signals ($U_{sv}$, $U_{sh}$) defined at the individual measurement points ($m_1$, $m_2$, $m_3$) at support places ($x_1$, $x_2$, $x_3$) for a later interpolation of support place tables (St2, St3), selecting individual measurement points ($m_1$, $m_2$, $m_3$) of the defined air mass flows which agree with established measurement points ($m_1$, $m_2$, $m_3$) of a predetermined characteristic curve, which represents a predetermined functional dependence of a theoretical output voltage value ($U_{theoretical1}$, $U_{theoretical2}$, $U_{theoretical3}$) of the air mass flow and entering into support places ($y_1$, $y_2$, $y_3$) of support place tables (St2, St3 said theoretical output voltage values ($U_{theoretical1}$, $U_{theoretical2}$, $U_{theoretical3}$) at the determined measurement points ($m_1$, $m_2$, $m_3$) of the predetermined characteristic curve.

19. A process as claimed in claim 18, further comprising replacing said crude bridge signals ($U_{sv}$, $U_{sh}$) at measurement points ($m_1$, $m_2$, $m_3$) by output voltage theoretical values ($U_y$).

20. A process as claimed in claim 19, wherein differences between said crude bride signals ($U_{sv}$, $U_{sh}$) and said output voltage theoretical values ($U_y$) are determined at measurement points ($m_1$, $m_2$, $m_3$) and are entered as correction values ($\Delta_{u1}$, $\Delta_{u2}$, $\Delta_{u3}$) at measurement points ($m_1$, $m_2$, $m_3$) of the respective support place tables (St2, St3).

21. A process for signal evaluation from an air-mass sensor having a module with two temperature sensors and two heat sensors exposed to an air flow, the temperature sensors and heat sensors being connected in respective bridges of a bridge circuit, and a microprocessor connected to the bridge circuit to receive output signals from the bridge circuit indicating mass of the air flow and its temperature and wherein the heat sensor of a first of said bridges is arranged upstream in said air flow and the heat sensor of a second of said bridges is arranged downstream in the air flow, said process comprising:

subtracting from a signal ($U_{mv}$) of the first bridge (I) a signal ($U_{mh}$) of the second bridge (II) to obtain a difference ($\Delta$), comparing said difference with adjusted threshold values, and obtaining a readout dependent on a sign of this difference ($\Delta$) from support place tables (St2, St3), in which correction values ($\Delta U_1$, $\Delta U_2$, $\Delta U_3$) or output voltage theoretical values ($U_y$) are filed as absolute values for a predetermined characteristic curve, producing a readout from said support place tables (St2, St3), if the magnitude ($\Delta$) of the signals at the first and second bridges ($U_{mv}$, $U_{mh}$) exceeds an upper threshold valued or falls below a lower threshold value, a constant output voltage signal ($U_a$) being produced at an output (A2) when said difference ($\Delta$) is within the upper and lower threshold values, an output signal ($U_{mv}$) corrected with correction values ($\Delta U_{1-3}$) or which takes over the output voltage theoretical value ($U_y$) is also subjected to a temperature compensation in another support place table (St4), a temperature signal ($U_{temp}$) calculated from the measured bridge signal ($U_{mv}$) of the first bridge (I) and its supply voltage ($U_q$) is introduced and its support places ($Y_k$) were empirically determined, and producing a temperature-compensated, corrected output voltage signal ($U_a$) at output (A2) of the air-mass sensor module.

22. A process as claimed in claim 21, wherein an additional temperature signal ($U_{temp}$) is determined within another signal evaluation path (S2), to which temperature output signals ($U_{f1}$, $U_{f2}$, $U_{f3}$) are assigned by a temperature characteristic curve filed in a support place table (St1), which signals are supplied at another output (A1) of the air-mass sensor module.

23. A process as claimed in claim 22, wherein a temperature signal ($U_{temp}$) is calculated from a ratio of a supply voltage signal ($U_q$) to the bridge signal ($U_{mv}$) of the first, front bridge.

24. A process as claimed in claim 23, wherein either an averaging (S1.1) of bridge signals ($U_{mv}$, $U_{mh}$) is produced within the first signal evaluating path (S1) or a pure signal evaluation (S1.2) is supplied without averaging the bridge signals ($U_{mv}$, $U_{mh}$).

25. A process as claimed in claim 24, wherein a constant output voltage signal ($U_a$) is output with a difference ($\Delta$) within predetermined threshold values.

26. A process as claimed in claim 25, wherein a characteristic-curve interpolation is conducted between support places ($x_1$, $x_2$, $x_3$) within support places (St2, St3).

27. An air mass sensor as claimed in claim 1, wherein said digital processing means of said microprocessor is preprogramed with said correction data based on receiving output signals from said bridge circuit correlated to a measured air flow and comparing said output signals to the correction data in said memory.

28. An air-mass sensor for measuring mass flow of intake air for an internal combustion engine comprising:

a self-contained air mass sensor module having a support provided with means for attachment in a flow path of air for the internal combustion engine, said sensor module including a measurement element disposed in said air flow path and including two temperature sensors and two heat sensors exposed to the air flow, said temperature sensors and said heat sensors being arranged in proximity to one another and connected in respective bridges of a bridge circuit, said bridges including respective resistances therein, and a microprocessor on said support and electrically connected to said bridge circuit to receive output signals from said bridge circuit representing mass of the air flow and its temperature thereof, said microprocessor including correction data to correct measurement inaccuracies of said signals from said measurement element, wherein the heat sensor of a first of said bridges is arranged upstream in said air flow and the heat sensor of the second of said bridges is arranged downstream in the air flow, wherein said microprocessor includes means for calibration of said sensor by the following steps:

producing respective measurement points ($m_1$, $m_2$, $m_3$) for different defined air mass flows past the sensors, providing crude bridge signals ($U_{sv}$, $U_{sh}$) for the individual measurement points from the first and second bridges, said crude bridge signals ($U_{sv}$, $U_{sh}$) being a measurement of or readjustment to obtain a renewed bridge balance for the respective air mass, storing in the microprocessor the crude bridge signals ($U_{sv}$, $U_{sh}$) defined at the individual measurement points ($m_1$, $m_2$, $m_3$) at support places ($x_1$, $x_2$, $x_3$) for a later interpolation of support place tables (St2, St3), selecting individual measurement points ($m_1$, $m_2$, $m_3$) of the defined air mass which agree with established measurement points ($m_1$, $m_2$, $m_3$) of a predetermined characteristic curve, which represents a predetermined functional dependence of a theoretical output voltage value ($U_{theoretical1}$, $U_{theoretical2}$, $U_{theoretical3}$) of the air mass flow and entering into support places ($y_1$, $y_2$, $y_3$) of support place tables (St2, St3) said theoretical output voltage values ($U_{theoretical1}$, $U_{theoretical2}$, $U_{theoretical3}$) at the determined measurement points ($m_1$, $m_2$, $m_3$) of the predetermined characteristic curve.

29. An air-mass sensor for measuring mass flow of intake air for an internal combustion engine comprising:

a self-contained air mass sensor module having a support provided with means for attachment in a flow path of air for the internal combustion engine, said sensor module including a measurement element disposed in said air flow path and including two temperature sensors and two heat sensors exposed to the air flow, said temperature sensors and said heat sensors being arranged in proximity to one another and connected in respective bridges of a bridge circuit, said bridges including respective resistances therein, and a microprocessor on said support and electrically connected to said bridge circuit to receive output signals from said bridge circuit representing mass of the air flow and its temperature thereof, said microprocessor including correction data to correct measurement inaccuracies of said signals from said measurement element, wherein the heat sensor of a first of said bridges is arranged upstream in said air flow and the heat sensor of the second of said bridges is arranged downstream in the air flow, wherein said microprocessor includes means for measuring magnitude and duration of air flow by the following steps:

subtracting from the signal ($U_{mv}$) of the first bridge (I) the signal ($U_{mh}$) of the second bridge (II) to obtain a difference ($\Delta$), comparing said difference with adjusted threshold values, and obtaining a readout dependent on a sign of this difference ($\Delta$) from support place tables (St2, St3), in which correction values ($\Delta U_1$, $\Delta U_2$, $\Delta U_3$) or output voltage theoretical values ($U_y$) are filed as absolute values for a predetermined characteristic curve producing a readout from said support place tables (St2, St3), only if the magnitude ($\Delta$) of the measured signals ($U_{mv}$, $U_{mh}$) exceeds an upper threshold valued or falls below a lower threshold value, and a constant output voltage signal ($U_a$) is produced at an output (A2) when said difference ($\Delta$) is within the upper and lower threshold values, an output signal ($U_{mv}$) corrected with correction values ($\Delta U_{1-3}$) or which takes over the output voltage theoretical value ($U_y$) is also subjected to a temperature compensation in another support place table (St4), a temperature signal ($U_{temp}$) calculated from the measured bridge signal ($U_{mv}$) of the first bridge (I) and its supply voltage ($U_q$) is introduced and its support places ($Y_k$) were empirically determined, and producing a temperature-compensated, corrected output voltage signal ($U_a$) at output (A2) of the air-mass sensor module.

* * * * *